2,957,011
Patented Oct. 18, 1960

2,957,011

17-OXYGENATED 1-ALKOXY - 4 - METHYLESTRA-1,3,5(10)-TRIEN-16-ONES AND INTERMEDIATES

Willard M. Hoehn, Wilmette, Ill., assignor to G. D. Searle & Co., Chicago, Ill., a corporation of Delaware No Drawing. Filed Nov. 9, 1959, Ser. No. 851,559

7 Claims. (Cl. 260—397.4)

The present invention is concerned generally with novel 16-ketosteroids and, more particularly, with 17-oxygenated 1 - alkoxy - 4-methylestra-1,3,5(10)-trien-16-ones of the structural formula

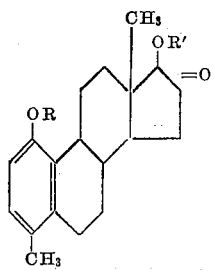

wherein R is a lower alkyl radical and R' is selected from the group consisting of hydrogen and lower alkanoyl radicals. The lower alkyl radicals represented by R are exemplified by methyl, ethyl, propyl, butyl, pentyl, hexyl, and the branched-chain isomers thereof. Examples of lower alkanoyl radicals as designated by R' are formyl, acetyl, propionyl, butyryl, valeryl, caproyl, and the branched, chain isomers thereof; said groups being the acyl radicals of alkanoic acids containing fewer than 7 carbon atoms.

The present invention encompasses also novel intermediates in the manufacture of the 16-keto compounds designated supra. These intermediates can be illustrated by the structural formula

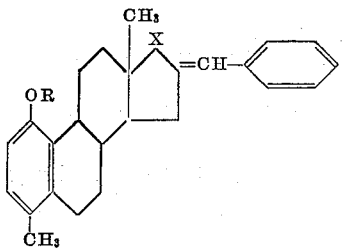

wherein X is selected from a group consisting of carbonyl, β-hydroxymethylene, and β-(lower alkanoyl)oxymethylene radicals, and R is a lower alkyl radical as defined supra.

A suitable starting material for the manufacture of the instant compounds is 1-hydroxy-4-methylestra-1,3,5(10)-trien-17-one. By reaction of the latter phenol with a dialkyl sulfate or an an alkyl halide in the presence of a suitable alkaline catalyst, the hydroxyl group is etherified to afford the corresponding 1-(lower alkoxy)-4-methylestra-1,3,5(10)-trien-17-one. As a specific example, reaction of the aforementioned phenol with propyl iodide and potassium carbonate results in 1-propoxy-4-methylestra-1,3,5(10)-trien-17-one.

When these 1-(lower alkoxy)-4-methylestra-1,3,5(10)-trien-17-ones are treated with benzaldehyde in an alkaline medium, the instant 16-benzylidene-17-keto compounds are obtained. Thus, 1-methoxy-4-methylestra-1,3,5(10)-trien-17-one is treated with benzaldehyde and methanolic sodium methoxide to produce 16-benzylidene-1-methoxy-4-methylestra-1,3,5(10)-trien-17-one. Reduction of these 17-keto compounds, suitably with sodium borohydride in an appropriate solvent, results in the corresponding 17β-hydroxy substances. This process is exemplified by the reaction of the aforementioned 1-methoxy-4-methylestra-1,3,5(10)-trien-17-one with sodium borohydride in aqueous isopropyl alcohol, resulting in 16-benzylidene-1-methoxy-4-methylestra-1,3,5(10)-trien-17β-ol. Esterification of these 17β-ols, suitably with an alkanoic acid anhydride in pyridine, produces the instant 17β - (lower alkanoyl)oxy - 16-benzylidene compounds. Typically, 16-benzylidene-1-methoxy-4-methyl-estra-1,3,5(10)-trien-17β-ol is treated with acetic anhydride and pyridine to afford 17β-acetoxy-16-benzylidene-1-methoxy-4-methylestra-1,3,5(10)-triene.

The 17β - (lower alkanoyl)oxy - 1-(lower alkoxy)-4-methylestra-1,3,5(10)-trien-16-ones of this invention can be produced by treating the aforementioned 17β-(lower alkanoyl)-16-benzylidene compounds with ozone in a suitable organic solvent. For example, the reaction of 17β - acetoxy - 16-benzylidene-1-methoxy-4-methylestra-1,3,5(10)-triene with ozone in a methylene chloride-methanol mixture at −70° results in 17β-acetoxy-1-methoxy-4-methylestra-1,3,5(10)-trien-16-one. In a similar manner, the instant 1 - (lower alkoxy)-17β-hydroxy-4-methylestra - 1,3,5(10) - trien-16-ones are produced by ozonolysis of the corresponding 16-benzylidene compounds. This process is illustrated by the conversion of 16 - benzylidene - 1 - methoxy - 4 - methylestra - 1,3,5(10)-trien-17β-ol to 17β-hydroxy-1-methoxy-4-methyl-estra-1,3,5(10)-trien-16-one.

The 16-keto compounds of this invention are useful as a result of their valuable pharmacological properties. They are, for example, estrogen antagonists in consequence of their ability to inhibit the vaginal alterations effected by estrogenic substances.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

Example 1

A mixture of 19.1 parts of 1-hydroxy-4-methylestra-1,3,5(10)-trien-17-one, 175 parts of propyl iodide, 40 parts of potassium carbonate, and 400 parts of ethanol is heated at reflux for about 4 hours, then cooled and filtered to remove inorganic salts. The filtrate is evaporated to dryness in vacuo and the residue treated with a mixture of methylene chloride and water. The organic layer is separated, washed with water, dried over anhydrous sodium sulfate, and evaporated to dryness under reduced pressure. The residue is crystallized from methanol to afford 4-methyl-1-propoxyestra-1,3,5(10)-trien-17-one.

Example 2

To a solution of 4 parts of 1-methoxy-4-methylestra-1,3,5(10)-trien-17-one and 3 parts of benzaldehyde in 30 parts of 95% ethanol is added 40 parts of methanolic sodium methoxide (prepared from the reaction of 1.25 parts of sodium with the appropriate quantity of methanol). This reaction mixture is heated at reflux for about 30 minutes, cooled, diluted with water, and extracted with a 1:1 ether-benzene solution. The organic extract is washed to neutrality with dilute hydrochloric acid, dried over anhydrous sodium sulfate, and evaporated to dryness under reduced pressure to afford 16-benzylidene - 1 - methoxy - 4 - methylestra - 1,3,5(10) - trien-17-one.

The substitution of an equivalent quantity of 4-methyl-1-propoxyestra-1,3,5(10)-trien-17-one in the instant process results in 16-benzylidene-4-methyl-1-propoxyestra-1,3,5(10)-trien-17-one.

*Example 3*

To a refluxing solution of 4.8 parts of 16-benzylidene-1-methoxy-4-methylestra-1,3,5(10)-trien - 17 - one in 70 parts of isopropanol is added dropwise, under nitrogen, a solution of 1.5 parts of sodium borohydride in 5 parts of water. The reaction mixture is heated at reflux for about 3 hours, cooled, and treated dropwise with a solution of 5 parts of glacial acetic acid in 16 parts of isopropanol. Dilution of this mixture with water results in a precipitate which is collected by filtration, washed with water, and dried, resulting in 16-benzylidene-1-methoxy - 4 - methylestra-1,3,5(10)-trien-17β-ol, M.P. 193–195°;

$$[\alpha]_D = +137.4°$$

By substituting an equivalent quantity of 16-benzylidene-4-methyl-1-propoxyestra-1,3,5(10)-trien-17 - one in the herein-described process, 16-benzylidene-4-methyl-1-propoxyestra-1,3,5(10)-trien-17β-ol is obtained.

*Example 4*

A mixture of 3.8 parts of 16-benzylidene-1-methoxy-4-methylestra-1,3,5(10)-trien-17β-ol, 25 parts of acetic anhydride, and 25 parts of pyridine is heated on a steam bath for about one hour. The reaction mixture is diluted with water to produce a gum, which is dissolved in methanol and reprecipitated by dilution with water. This gum is extracted with benzene and the benzene extract evaporated to dryness in vacuo to produce 17β-acetoxy-16-benzylidene-1-methoxy - 4 - methylestra-1,3,5(10)-triene.

The substitution of equivalent quantities of 16-benzylidene-4-methyl-1-propoxyestra-1,3,5(10)-trien-17β-ol and of butyric anhydride in the procedure of this example results in 16-benzylidene-17β-butyroxy-4-methyl-1-propoxyestra-1,3,5(10)-triene.

*Example 5*

A solution of 4 parts of 17β-acetoxy-16-benzylidene-1-methoxy-4-methylestra-1,3,5(10)-triene in 80 parts of methylene chloride and 24 parts of methanol is treated with ozone at −70° until ozonolysis is complete. The ozonide is decomposed by treating the reaction mixture with one part of zinc dust and two parts of acetic acid for about 10 minutes. The unreacted benzaldehyde is removed by steam distillation and the aqueous residue extracted with ether. The organic layer is separated, washed with water, dried over anhydrous sodium sulfate, and concentrated to dryness under reduced pressure. The residue is dissolved in benzene and adsorbed on silica gel. Elution of this chromatographic column with 2% ethyl acetate in benzene affords a solid product which is triturated with methanol to yield pure 17β-acetoxy-1-methoxy-4-methylestra-1,3,5(10) - trien - 16 - one, M.P. 193–195°.

The substitution of an equivalent quantity of 16-benzylidene-4-methyl-1-methoxy-1,3,5(10)-trien-17β - ol or 16-benzylidene-17β-butyroxy-4-methyl - 1 - propoxyestra-1,3,5(10)-triene in the herein-described process results in 17β-hydroxy-4-methyl-1-methoxyestra - 1,3,5(10) - trien-16-one and 17β - butyroxy-4-methyl-1-propoxyestra-1,3,5 (10)-trien-16-one.

What is claimed is:

1. A compound of the structural formula

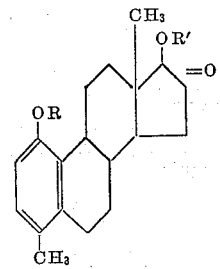

wherein R is a lower alkyl radical and R' is selected from the group consisting of hydrogen and lower alkanoyl radicals.

2. 17β-acetoxy-1-methoxy - 4 - methylestra-1,3,5(10)-trien-16-one.

3. 17β-hydroxy-1-methoxy - 4 - methylestra-1,3,5(10)-trien-16-one.

4. A compound of the structural formula

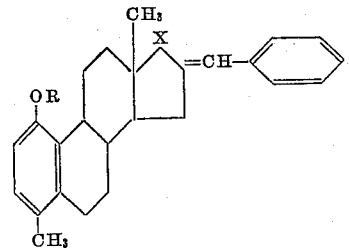

wherein R is a lower alkyl radical, and X is selected from the group consisting of carbonyl, β-hydroxymethylene, and β-(lower alkanoyl)oxymethylene radicals.

5. 17β-acetoxy-16-benzylidene-1-methoxy - 4 - methylestra-1,3,5(10)-triene.

6. 16-benzylidene-1-methoxy-4-methylestra - 1,3,5(10-trien-17β-ol.

7. 16-benzylidene-1-methoxy-4-methylestra - 1,3,5(10-trien-17-one.

References Cited in the file of this patent

Dodson et al.: J.A.C.S., vol. 80; 5004–5 1958.